United States Patent
Tsukahara

(10) Patent No.: US 11,978,483 B2
(45) Date of Patent: May 7, 2024

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Wataru Tsukahara, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/931,679

(22) Filed: Sep. 13, 2022

(65) Prior Publication Data
US 2023/0307002 A1    Sep. 28, 2023

(30) Foreign Application Priority Data

Mar. 24, 2022 (JP) .................. 2022-048990

(51) Int. Cl.
*G11B 33/14* (2006.01)
*G11B 21/08* (2006.01)

(52) U.S. Cl.
CPC .................. *G11B 21/083* (2013.01)

(58) Field of Classification Search
CPC ......... G11B 5/54; G11B 20/20; G11B 5/5539; G11B 5/588; G11B 33/14; G11B 33/08; G11B 33/1406

USPC .......................................... 360/75, 76, 97.12
See application file for complete search history.

(56) References Cited

U.S. PATENT DOCUMENTS

| | | | |
|---|---|---|---|
| 6,097,565 A | 8/2000 | Sri-Jayantha et al. | |
| 6,563,663 B1 | 5/2003 | Bi et al. | |
| 6,760,183 B2 | 7/2004 | Kusumoto | |
| 6,775,091 B1* | 8/2004 | Sutardja ............ | G11B 5/59627 360/77.04 |
| 7,009,797 B2 | 3/2006 | Zayas et al. | |
| 7,564,637 B2 | 7/2009 | Kudo et al. | |
| 7,633,705 B2* | 12/2009 | Sudo .................. | G11B 5/59627 360/77.04 |
| 8,792,200 B1 | 7/2014 | Tam et al. | |

FOREIGN PATENT DOCUMENTS

| | | |
|---|---|---|
| JP | H10-027442 A | 1/1998 |
| JP | 2002-544639 A | 12/2002 |
| JP | 2007-080388 A | 3/2007 |

\* cited by examiner

*Primary Examiner* — Nabil Z Hindi
(74) *Attorney, Agent, or Firm* — Knobbe, Martens, Olson & Bear, LLP

(57) ABSTRACT

According to embodiments, a magnetic disk apparatus includes a magnetic disk, a magnetic head, a temperature sensor, and a controller. The magnetic disk has formed therein a servo sector in which servo data including a first post code and a second post code is recorded. In the positioning of the magnetic head, the controller performs a correction using a third post code that is based on the first and second post codes and a first temperature detected by the temperature sensor.

14 Claims, 7 Drawing Sheets

FIG.2
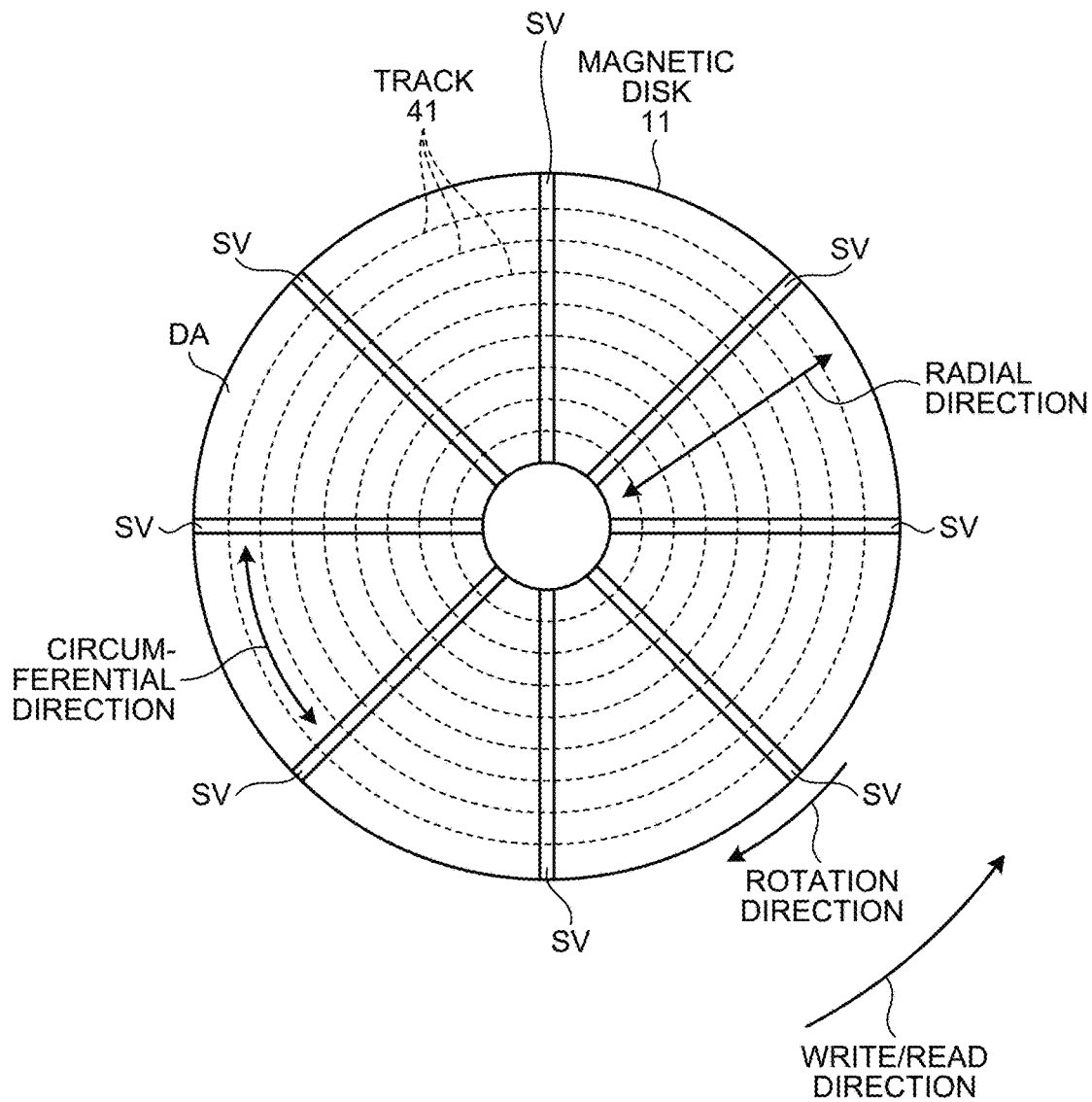
FIG.3
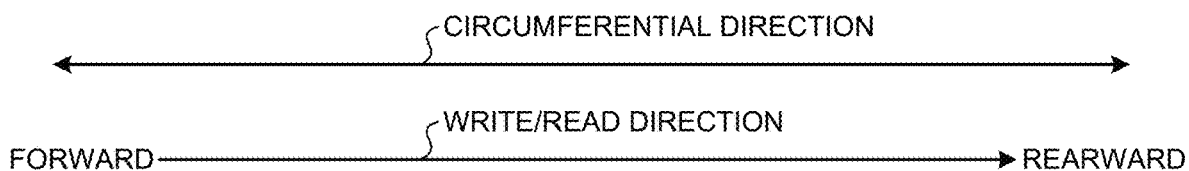
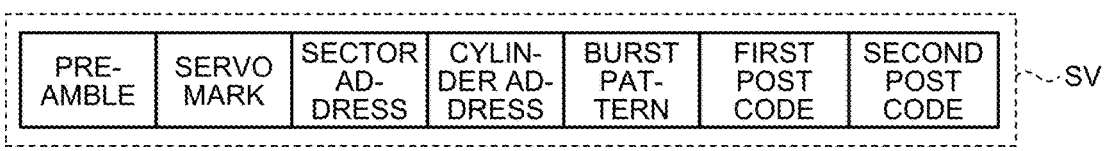

MAGNETIC DISK APPARATUS AND METHOD

CROSS-REFERENCE TO RELATED APPLICATIONS

This application is based upon and claims the benefit of priority from Japanese Patent Application No. 2022-048990, filed on Mar. 24, 2022; the entire contents of which are incorporated herein by reference.

FIELD

Embodiments described herein relate generally to a magnetic disk apparatus and method.

BACKGROUND

A repeatable position error (RPE) has conventionally been known as one component of a positioning error of a magnetic head in a magnetic disk apparatus. The RPE is an amount of positional deviation that occurs on a magnetic disk between an actual track trajectory and a track trajectory defined by a burst pattern and varies in synchronization with rotation of the magnetic disk (and a spindle motor). In order to cancel out the RPE, a position command value indicating a target position is corrected by an amount of deviation that is based on a position command value corresponding to the RPE. The amount of deviation based on the position command value corresponding to the RPE is referred to as a repeatable runout (RRO).

In a process of manufacturing the magnetic disk apparatus, an RRO is calculated, and a value corresponding to the obtained RRO is recorded on a magnetic disk. This value is referred to as a post code (or RRO bit). When the magnetic disk apparatus is used, a position command value is corrected using the post code recorded on the magnetic disk.

BRIEF DESCRIPTION OF THE DRAWINGS

FIG. 2 is a schematic diagram illustrating an example of the configuration of a magnetic disk according to the first embodiment;

FIG. 3 illustrates an example of servo data written to a servo sector SV in the first embodiment;

DETAILED DESCRIPTION

Figure 1:
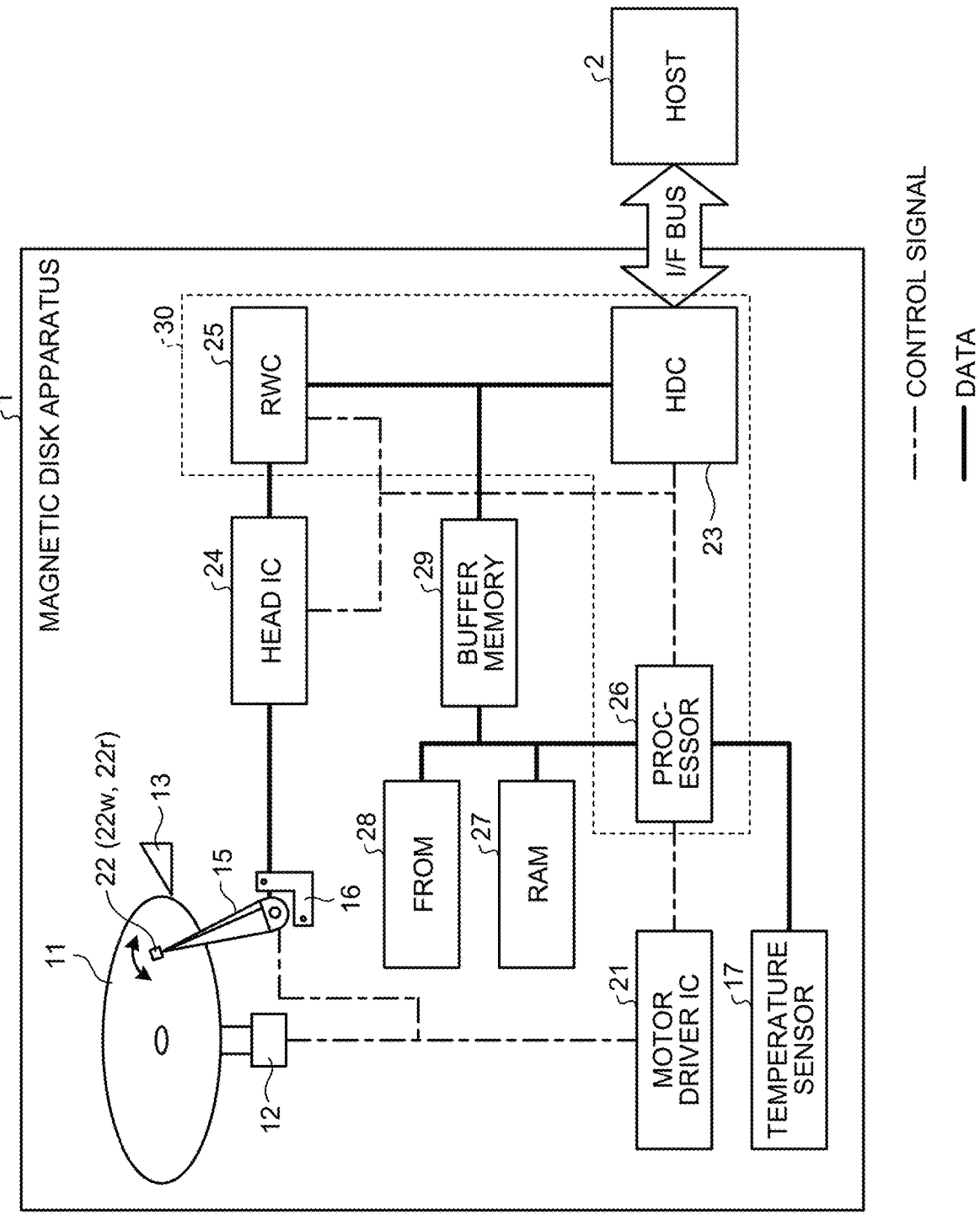
FIG. 1 is a schematic diagram illustrating an example of the configuration of a magnetic disk apparatus according to a first embodiment.

According to present embodiments, a magnetic disk apparatus includes a magnetic disk, a magnetic head, a temperature sensor, and a controller. The magnetic disk has formed therein a servo sector in which servo data including a first post code and a second post code is recorded. In the positioning of the magnetic head, the controller performs a correction using a third post code that is based on the first and second post codes and a first temperature detected by the temperature sensor.

In the following, an RRO means, unless otherwise specifically noted, an amount of positional deviation on the magnetic disk that varies in synchronization with rotation of the magnetic disk (and a spindle motor) and an amount of positional deviation based on a position command value.

An RRO resulting solely from the shape of tracks formed in the magnetic disk exhibits no change or, if any, very small change, according to temperature. However, an RRO may include not only components resulting from the shape of tracks but also, for example, components resulting from vibrations of a spindle motor (SPM) for rotating the magnetic disk. The components included in the RRO that result from vibrations of the spindle motor may change according to temperature.

Even in a case where, as described above, an RRO includes components that change according to temperature, the RRO can be accurately corrected as long as the temperature when a correction is made using post codes recorded in the magnetic disk is close to the temperature when the post codes were generated. However, the accuracy in correction of the RRO will decrease if the two temperatures are significantly different from each other.

In embodiments, accordingly, first and second post codes are recorded in the magnetic disk in advance. The controller of the magnetic disk apparatus obtains a third post code, which is to be actually used for correction of the RRO, based on the first and second post codes and a temperature detection value obtained by the temperature sensor.

According to the above configuration, the post code is corrected according to temperature, so that, even when the temperature during operation is significantly different from the temperature at generation of post codes, a decrease in the accuracy in correction of the RRO that results from the significant difference in temperature can be suppressed.

The following provides more specific descriptions. An RRO can be deemed as the sum of the amounts of positional deviation of different rotation orders (hereinafter simply referred to as "orders") based on a rotation of the magnetic disk. Thus, the post code is formed as the sum of amounts of correction for the individual orders. An amount of positional deviation of the RRO that pertains to a particular order (referred to as the "first order") may change according to temperature.

For example, the pattern of a change in the amount of positional deviation pertaining to the first order may be constituted by a change in a phase. In such a case, until reaching 180 degrees, the difference between the phase of the amount of correction of the generated post codes that pertains to the first order and the phase of the amount of positional deviation that pertains to the first order increases, as the difference between the temperature at generation of the post codes and the temperature during operation increases. For example, if the difference between the phase of the amount of correction pertaining to the first order and the phase of the amount of positional deviation pertaining to the first order reaches 180 degrees, the positioning accuracy will be significantly deteriorated due to the post codes including the amount of correction pertaining to the first order.

In embodiments, as an example, an amount of correction pertaining to a first order is a first post code among post codes generated during manufacturing, and an amount of correction pertaining to another order (i.e., an order at which an amount of correction does not change according to temperature) among the post codes is a second post code. The controller uses the sum of the first and second post codes as a third post code in the case of a small difference between the temperature at generation of the post codes and the temperature during operation. The controller uses the second post code as a third post code in the case of a large difference between the temperature at generation of the post codes and the temperature during operation.

In this way, deterioration of the positioning accuracy that results from inclusion of an amount of correction pertaining to the first order can be suppressed when there is a large difference between the temperature at generation of the post codes and the temperature during operation. Thus, a magnetic disk apparatus can be provided that allows for an accurate correction of a positioning error of a magnetic head.

The techniques of embodiments can be applied even when the pattern of a change in an amount of positional deviation pertaining to the first order is constituted by a change (e.g., a change in amplitude) other than a change in phase. In particular, if the temperature at generation of the post codes is significantly different from the temperature during operation, the positioning accuracy can be suppressed from deteriorating by suppressing the first post code, which could be a cause of deterioration of the positioning accuracy.

The following describes a magnetic disk apparatus and a method according to embodiments in detail by referring to the accompanying drawings. Note that the present invention is not limited by these embodiments.

First Embodiment

FIG. 1 is a schematic diagram illustrating an example of the configuration of a magnetic disk apparatus 1 according to the first embodiment.

The magnetic disk apparatus 1 is connected to a host 2. The magnetic disk apparatus 1 can receive access commands such as write commands and read commands from the host 2.

The magnetic disk apparatus 1 includes a magnetic disk 11 having a magnetic layer formed on a surface thereof. The magnetic disk apparatus 1 writes data to the magnetic disk 11 or reads data from the magnetic disk 11 in accordance with an access command.

Data is written to or read from the magnetic disk 11 via a magnetic head 22. Specifically, in addition to the magnetic disk 11, the magnetic disk apparatus 1 includes a spindle motor 12, a lamp 13, an actuator arm 15, a voice coil motor (VCM) 16, a temperature sensor 17, a motor driver integrated circuit (IC) 21, a magnetic head 22, a hard disk controller (HDC) 23, a head IC 24, a read/write channel (RWC) 25, a processor 26, a RAM 27, a flash read only memory (FROM) 28, and a buffer memory 29.

The magnetic disk 11 is rotated at a prescribed rotation speed by the spindle motor (SPM) 12, which is attached coaxially with the magnetic disk 11. The spindle motor 12 is driven by the motor driver IC 21.

The processor 26 controls the rotations of the spindle motor 12 and the VCM 16 via the motor driver IC 21.

The magnetic head 22 writes/reads information to/from the magnetic disk 11 by means of a write core 22$w$ and a read core 22$r$ of the magnetic head 22. The magnetic head 22 is attached to a leading end of the actuator arm 15. The magnetic head 22 is moved in the radial direction of the magnetic disk 11 by the VCM 16, which is driven by the motor driver IC 21. Note that the single magnetic head 22 may be provided with a plurality of write cores 22$w$ and/or a plurality of read cores 22$r$.

When, for example, the rotation of the magnetic disk 11 stops, the magnetic head 22 is moved onto the lamp 13. The lamp 13 is configured to hold the magnetic head 22 at a position spaced apart from the magnetic disk 11.

During a read operation, the head IC 24 amplifies a signal read from the magnetic disk 11 by the magnetic head 22 and outputs the amplified signal for supply to the RWC 25. During a write operation, the head IC 24 amplifies a signal corresponding to data to be written that is supplied from the RWC 25, and supplies the amplified signal to the magnetic head 22.

The HDC 23 may control data transmission/reception to/from the host 2 performed via an interface bus, control the buffer memory 29, and perform an error correction process for data that has been read.

The buffer memory 29 is used as a buffer for data to be transmitted/received to/from the host 2. For example, the buffer memory 29 may be used to temporarily store data to be written or data read from the magnetic disk 11.

For example, the buffer memory 29 may be formed from a volatile memory capable of performing a high-speed operation. The type of a memory for forming the buffer memory 29 is not limited to a particular one. For example, the buffer memory 29 may be formed from a dynamic random access memory (DRAM), a static random access memory (SRAM), or a combination thereof. Alternatively, the buffer memory 29 may be formed from any nonvolatile memory.

The RWC 25 modulates data to be written supplied from the HDC 23 and supplies the modulated data to the head IC 24. The RWC 25 demodulates a signal read from the magnetic disk 11 and supplied thereto from the head IC 24, and outputs the demodulated signal to the HDC 23 in the form of digital data.

The temperature sensor 17 detects the temperature of the magnetic disk apparatus 1 during operation. The temperature detected by the temperature sensor 17 is used to obtain a third post code.

The processor 26 is a circuit operated in accordance with a computer software program. For example, the processor 26 may be a central processing unit (CPU). The RAM 27, the flash read only memory (FROM) 28, the buffer memory 29, and the temperature sensor 17 are connected to the processor 26.

The FROM 28 is a nonvolatile memory. The FROM 28 stores, for example, a firmware program and various operation parameters. The firmware program may be stored in the magnetic disk 11.

For example, the RAM 27 may be formed from a DRAM, an SRAM, or a combination thereof. The RAM 27 is used by the processor 26 as a memory for an operation. The RAM 27 is used as an area into which a firmware program is loaded, and as an area in which various management data are temporarily stored.

The processor 26 performs overall control of the magnetic disk apparatus 1 in accordance with a firmware program stored in the FROM 28 or the magnetic disk 11. For example, the processor 26 may load a firmware program from the FROM 28 or the magnetic disk 11 into the RAM 27, and control, for example, the motor driver IC 21, the head IC 24, the RWC 25, and the HDC 23 in accordance with the loaded firmware program.

A configuration including the HDC 23, the RWC 25, and the processor 26 can be deemed as a controller 30. In addition to these elements, the controller 30 may include another element (e.g., RAM 27, FROM 28, or buffer memory 29).

Some of or all of the functions of the processor 26 may be implemented by a hardware circuit such as a field-programmable gate array (FPGA) or an application specific integrated circuit (ASIC).

FIG. 2 is a schematic diagram illustrating an example of the configuration of the magnetic disk 11 according to the first embodiment. Note that FIG. 2 depicts an example of the rotation direction of the magnetic disk 11. The magnetic head 22 moves relative to the magnetic disk 11 in accordance with the rotation of the magnetic disk 11. Thus, data is written or read by the magnetic head 22 in a write/read direction, i.e., a circumferential direction, which is opposite to the rotation direction of the magnetic disk 11.

In a manufacturing, servo data to be used for the positioning of the magnetic head 22 is written to the magnetic disk 11 by, for example, a servo writer or self-servo writing (SSW). FIG. 2 depicts, as an example of the positioning of servo areas to which servo data has been written, a plurality of servo areas SV arranged in a radiation formation in the radial direction and having prescribed spacings therebetween in the circumferential direction. Every two servo areas SV successive in the circumferential direction have disposed therebetween a data area DA to which data is written.

A plurality of concentric tracks 41 are set in the radial direction of the magnetic disk 11. The data areas DA have formed therewithin a plurality of data sectors continuously formed along each of the tracks 41. Servo data written to the servo areas SV is used for the positioning of the read core 22r or the write core 22w of the magnetic head 22 onto a target track 41. User data is written to or read from a target data sector, with the read core 22r or the write core 22w positioned on the target track 41. Areas on the tracks 41 that are divided by the servo areas SV are hereinafter referred to as servo sectors SV.

FIG. 3 illustrates an example of servo data written to a servo sector SV in the first embodiment. In this example, a preamble, a servo mark, a sector address, a cylinder address, a burst pattern, a first post code, and a second post code are written to the servo sector SV in this order in the write/read direction.

Positional relationships in the circumferential direction are defined. When first data and second data are written in the write/read direction and the first data is written to an area that is read prior to the second data, the direction from an area to which the second data has been written toward the area of the first data is defined as "forward" of the area to which the second data has been written. By contrast, the direction from the area to which the first data has been written toward the area of the second data is defined as "rearward" of the area to which the first data has been written. When a first area is mentioned, the expression "immediately preceding second area" refers to the last second area that the magnetic head 22 passes before passing the first area. When a first area is mentioned, the expression "immediately following second area" refers to the initial second area that the magnetic head 22 passes after passing the first area.

A preamble is a signal for synchronization with a regeneration signal for a servo pattern. A servo mark indicates a start of servo data. A sector address is an ID for identifying an individual servo sector SV on a track 41. A cylinder address is an ID for identifying an individual track 41 provided on the magnetic disk 11. A burst pattern is data used to detect the amount of positional deviation of the magnetic head 22 in the radial direction with respect to the track center of a track 41. The burst pattern is formed from a repetitive pattern having a prescribed cycle. For example, the cylinder address may be provided as an integer, and an amount of offset that is determined with reference to a position indicated by the cylinder address and that is expressed by a value of lower than one can be obtained by demodulating the burst pattern.

First and second post codes are data for correcting an RRO. The first post code is components pertaining to an order that exhibits a change according to temperature, among post codes generated during manufacturing (i.e., during the manufacturing process). The second post code is components pertaining to an order that does not exhibit a change according to temperature, among the post codes generated during manufacturing.

Correcting an RRO, i.e., performing positioning by applying a post code to a position command value indicating a target position, may hereinafter be referred to as an RRO correction.

A set of first and second post codes recorded in each servo sector SV is typically used for an RRO correction at the position of an immediately following servo sector SV. However, a set of first and second post codes recorded in each servo sector SV may be used for an RRO correction at the position of a servo sector SV two or more servo sectors SV after.

One servo sector SV may have recorded therein one or more sets of first and second post codes used for RRO corrections at the positions of one or more following servo sectors SV.

Accordingly, one servo sector SV may have stored therein a set of first and second post codes used for an RRO correction at the position of any of the servo sectors SV. Alternatively, one servo sector SV may have recorded therein two or more sets of first and second post codes.

The following describes operations of the magnetic disk apparatus 1 according to the first embodiment.

Figure 4:
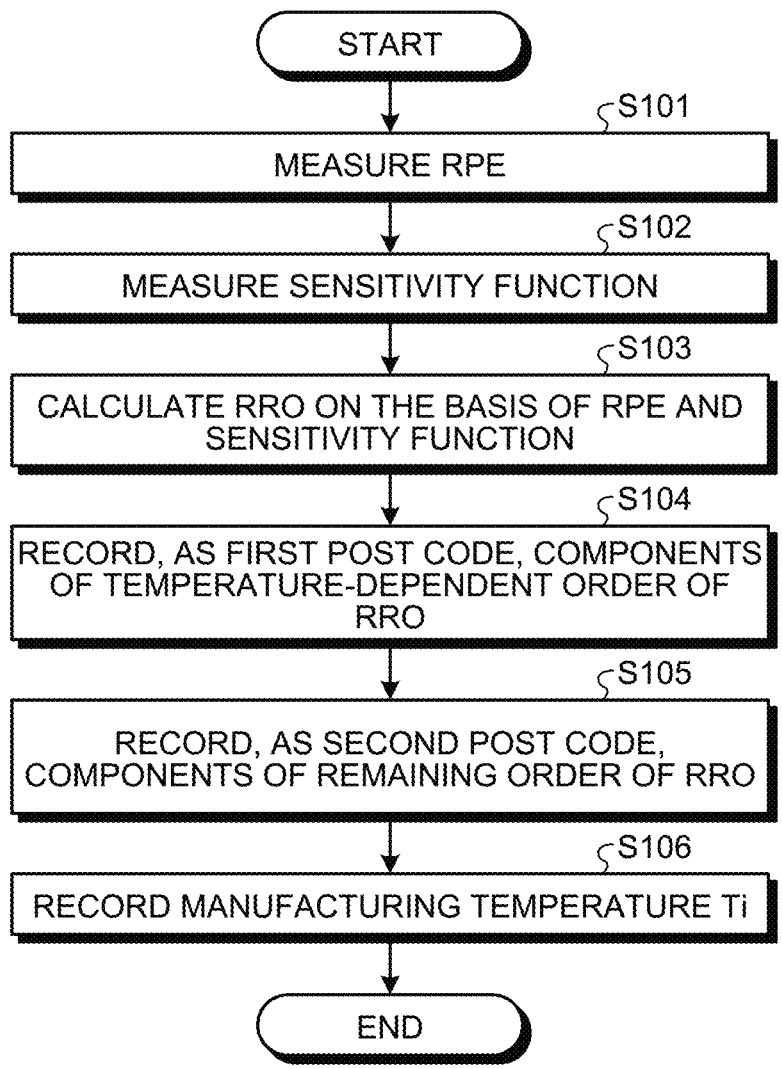
FIG. 4 is a flowchart illustrating an example of operations of a magnetic disk apparatus according to the first embodiment during manufacturing.

FIG. 4 is a flowchart illustrating an example of operations of the magnetic disk apparatus 1 according to the first embodiment during manufacturing. In the manufacturing process, first, the magnetic disk apparatus 1 is assembled, and servo data, excluding first and second post codes, is recorded. Then, the magnetic disk apparatus 1 records the first and second post codes through a series of operations indicated in FIG. 4. The series of operations indicated in FIG. 4 is performed under the control of the controller 30. In one example, the processor 26 implements the series of operations indicated in FIG. 4 in accordance with a firmware program. The firmware program for implementing the series of operations indicated in FIG. 4 may be included in a firmware program used when an end user uses the magnetic disk apparatus 1, or may be different from the firmware program used when the end user uses the magnetic disk apparatus 1. Note that portions of, or the entirety of, the series of operations indicated in FIG. 4 may be implemented by a component other than the processor 26, e.g., by the HDC 23.

First, the controller 30 measures an RPE (S101). The controller 30 measures the sensitivity function of a servo system (S102). The controller 30 calculates an RRO by applying, to the measured value of the RPE, a characteristic that is an inversion of the sensitivity function (S103).

Next, the controller 30 records, in a servo sector SV as a first post code, the components of a temperature-dependent order of the RRO (S104). The temperature-dependent order is specified in advance by a designer. Alternatively, prior to S104, the controller 30 may specify the temperature-dependent order by measurement or calculation.

The controller 30 records the components of the remaining orders of the RRO in the servo sector SV as a second post code (S105).

The controller 30 performs the processes of S101 to S105 for every servo sector SV.

The controller 30 records the temperature observed when the processes of S101 to S105 were performed, i.e., a manufacturing temperature, at a prescribed position in a nonvolatile manner (S106). The position at which the manufacturing temperature is recorded may be the FROM 28 or the magnetic disk 11. The manufacturing temperature may be incorporated into the firmware program.

The environmental temperature is adjusted to a prescribed temperature in a factory or manufacturing apparatus in which the processes of S101-S105 are performed. The controller 30 may obtain the manufacturing temperature through input by a manufacturing apparatus or a manufacturer. Alternatively, the controller 30 may obtain the manufacturing temperature by means of the temperature sensor 17.

The manufacturing temperature recorded in the process of S106 is hereinafter referred to as a manufacturing temperature Ti.

Upon S106 being completed, the operations of the magnetic disk apparatus 1 according to the first embodiment during manufacturing end.

Figure 5:
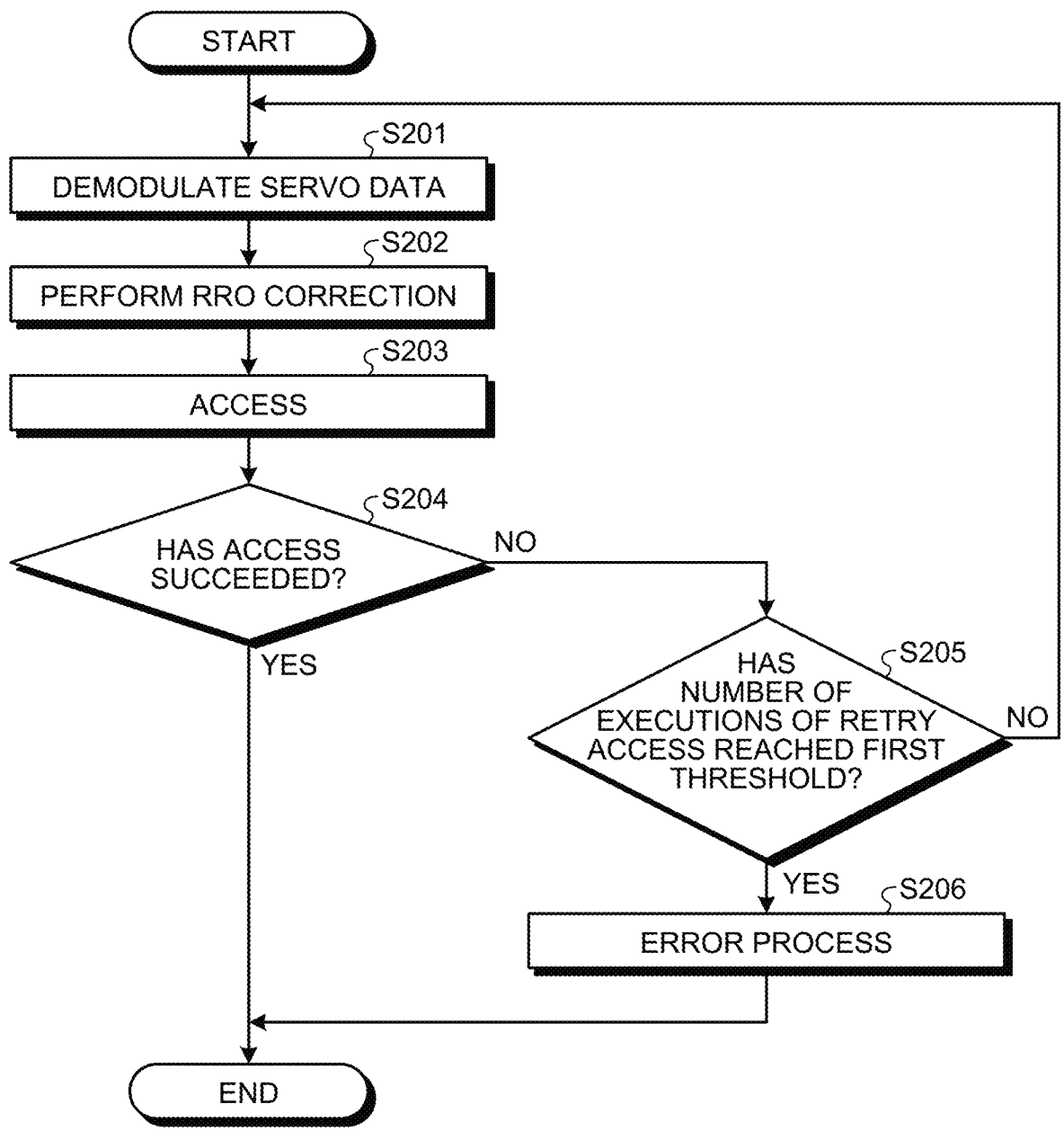
FIG. 5 is a flowchart illustrating an example of operations of the magnetic disk apparatus according to the first embodiment accessing a magnetic disk.

FIG. 5 is a flowchart illustrating an example of operations of the magnetic disk apparatus 1 according to the first embodiment accessing the magnetic disk 11. The access to the magnetic disk 11 is data writing or reading. Thus, the series of operations indicated in FIG. 5 can be performed for both the operations of writing to the magnetic disk 11 and the operations of reading from the magnetic disk 11.

The controller 30 (e.g., RWC 25) demodulates servo data (S201). The controller 30 performs an RRO correction for a position command value that is based on the demodulated servo data (S202). The controller 30 accesses a data area DA under positioning control to which the RRO correction has been applied (S203).

In S202, an RRO correction is performed on the basis of post codes (first and second post codes) demodulated in an immediately preceding servo sector SV. As described above, the relationship between a servo sector SV from which post codes are read and a servo sector SV at the position at which an RRO correction is performed is not limited to this.

Subsequently, the controller 30 determines whether the access has succeeded (S204). When the access has succeeded (S204: Yes), the controller 30 ends the operation of accessing the data area DA.

In the case of reading, the expression "access has succeeded" means that data including no error has been successfully acquired from a data area DA. For example, the controller 30 may have an error correction function. The controller 30 performs an error correction for the data acquired from the data area DA, and determines that the reading has succeeded if data including no error is acquired as a result of the error correction. If a correction cannot be made through the error correction, the controller 30 determines that the reading has failed.

In the case of writing, the expression "access has succeeded" means, for example, that the amount of positional deviation of a writing position from the center of a track 41 in the radial direction is small. The controller 30 determines that the writing has succeeded when the amount of positional deviation is less than a prescribed low value. The controller 30 determines that the writing has failed when the amount of positional deviation is greater than the prescribed low value.

The method for determining whether access has succeeded is not limited to the one in the above example.

When the access has failed (S204: No), the controller 30 can perform the processes of S201 to S204 again. Re-executing the processes of S201 to S204 is referred to as retry access. However, an upper limit is set for the number of times retry access can be performed. In this example, the upper limit is referred to as a first threshold. The first threshold is an integer of 0 or higher. The number of executions of retry access may be counted for each data sector, may be counted for each servo sector SV, or may be counted for each track 41.

When the access has failed (S204: No), the controller 30 determines whether the number of executions of retry access has reached the first threshold (S205). When the number of executions of retry access has not reached the first threshold (S205: No), the control shifts to S201. When the number of executions of retry access has reached the first threshold (S205: Yes), the controller 30 performs a prescribed error process (S206), and the access operation ends.

The error process is not limited to a particular process. For example, the controller 30 may perform an error process of reporting to the host 2 that access has failed.

Figure 6:
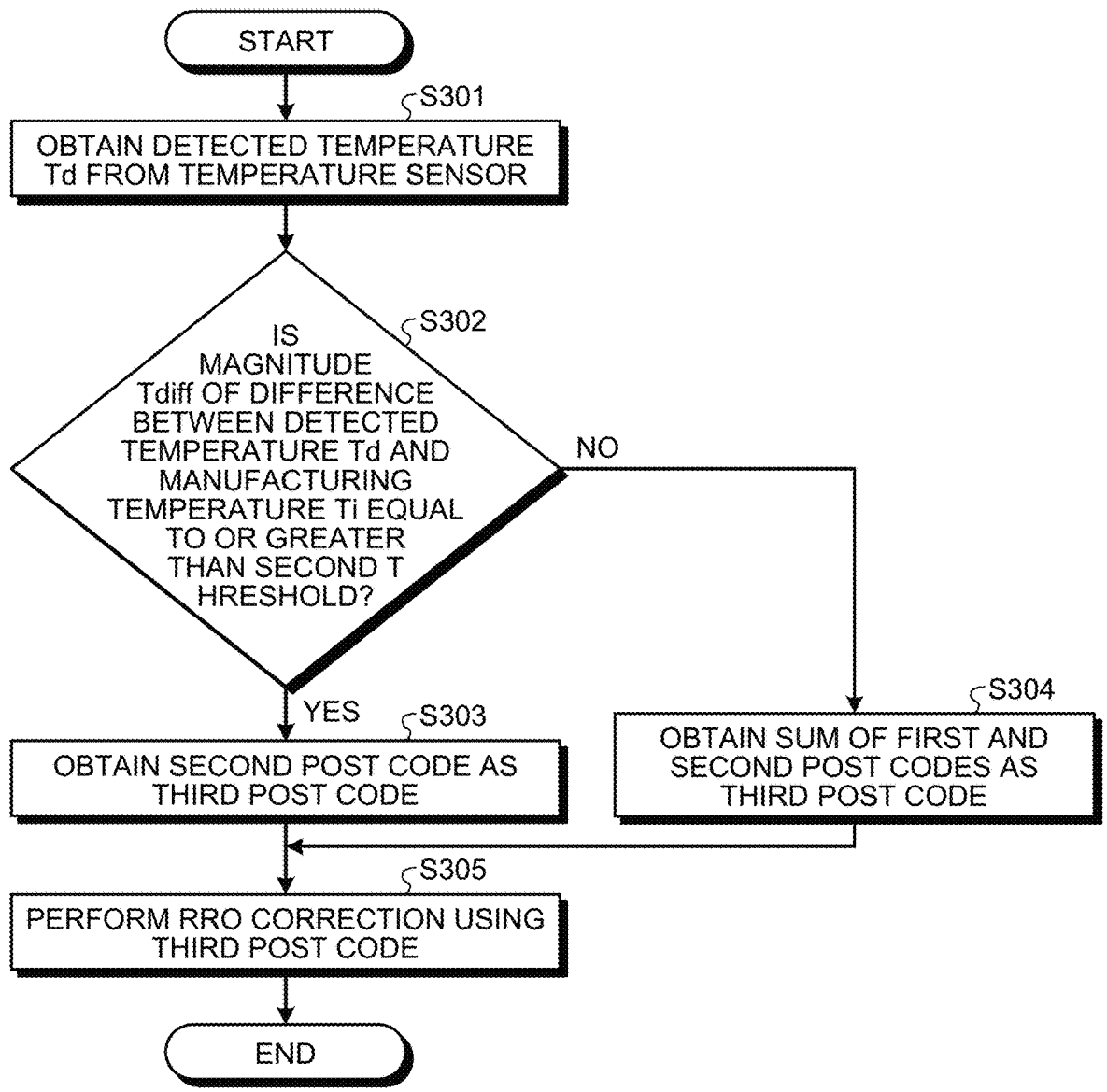
FIG. 6 is a flowchart illustrating an example of operations of the magnetic disk apparatus according to the first embodiment performed in the process of S202 indicated in FIG. 5.

FIG. 6 is a flowchart illustrating an example of operations of the magnetic disk apparatus 1 according to the first embodiment performed in the process of S202 depicted in FIG. 5.

First, the controller 30 obtains a detected temperature from the temperature sensor 17 (S301). The detected temperature obtained in S301 is referred to as a detected temperature Td.

Subsequently, the controller 30 determines whether the magnitude of the difference between the detected temperature Td and the manufacturing temperature Ti is equal to or greater than a prescribed value (S302). The prescribed value compared in S302 with the magnitude of the difference between the detected temperature Td and the manufacturing temperature Ti is referred to as a second threshold. Tdiff denotes the magnitude of the difference between the detected temperature Td and the manufacturing temperature Ti.

When Tdiff is equal to or greater than the second threshold (S302: Yes), the controller 30 obtains the second post code as the third post code (S303). When Tdiff is not equal to or greater than the second threshold (S302: No), the controller 30 obtains the sum of the first and second post codes as the third post code (S304).

After S303 or S304, the controller 30 performs an RRO correction using the third post code (S305), and the operations end.

The processing performed when Tdiff is equal to the second threshold is not limited to the example indicated in FIG. 6. When Tdiff is equal to the second threshold, the controller 30 may perform the process of S304.

The timing at which the process of S301 is performed is not limited to the example described above. For example, the controller 30 may periodically obtain the temperature of the magnetic disk apparatus 1 and, in S202, use the most recently obtained temperature as the detected temperature Td.

With respect to the illustration of FIG. 6, the situation in which Tdiff is not equal to or greater than the second threshold is an example a first case. The situation in which Tdiff is equal to or greater than the second threshold is an example a second case, in which Tdiff is greater than in the first case.

Figure 7:
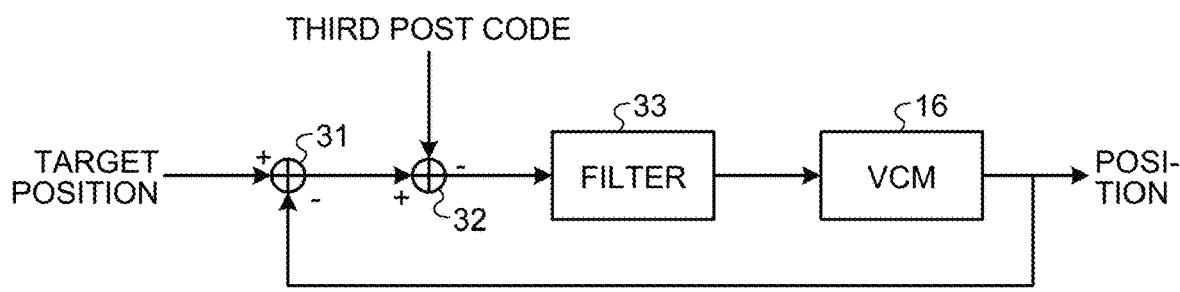
FIG. 7 is a block diagram for illustrating an example of control of an RRO correction according to the first embodiment using a third post code, where the control indicated in FIG. 7 is performed in S305 in FIG. 6.

FIG. 7 is a block diagram for illustrating an example of control of an RRO correction according to the first embodiment using the third post code. where the control indicated in FIG. 7 is performed in S305 in FIG. 6;

According to the example illustrated in FIG. 7, an adder 31 subtracts, from a position command value indicating a target position, a current position to which the magnetic head 22 has moved as a result of output of the VCM 16. Thus, feedback for output of the VCM 16 is provided.

Subsequently, an adder 32 subtracts the third post code from output of the adder 31. As a result, a correction corresponding to an RRO is performed for the position command value.

Output of the adder 32 is sent to the VCM 16 after being processed by a prescribed filter 33 in the controller 30. The VCM 16 moves the magnetic head 22 to a position corresponding to the command value after the RRO correction.

According to the first embodiment, as described above, the magnetic disk 11 has formed therein a servo sector SV in which servo data including the first and second post codes is recorded. The first post code is the components of an order dependent on the temperature of the magnetic disk apparatus 1, and the second post code is the components independent of the temperature of the magnetic disk apparatus 1. In the first case, the controller 30 obtains the sum of the first and second post codes as the third post code. The controller 30 obtains the second post code as the third post code in the second case, in which the difference between a detected temperature obtained by the temperature sensor and the temperature observed when the first and second post codes were generated is larger than in the first case. Then, the controller 30 makes a correction by using the third post code in the positioning of the magnetic head 22.

If the temperature at generation of the post codes is significantly different from the temperature during operation, the post code that does not include the first post code, which could be a cause of deterioration of the positioning accuracy, is used as the third post code, so that the positioning accuracy can be suppressed from deteriorating. Thus, the magnetic disk apparatus 1 that allows for an accurate correction of a positioning error of the magnetic head can be provided.

Second Embodiment

The algorithm for obtaining the third post code on the basis of the first and second post codes and the temperature can be variously changed. The second embodiment is described herein with reference to another example of the algorithm for obtaining the third post code. Matters other than the operation of obtaining the third post code are similar to those in the first embodiment, and the second embodiment is described only for the operation of obtaining the third post code.

Figure 8:
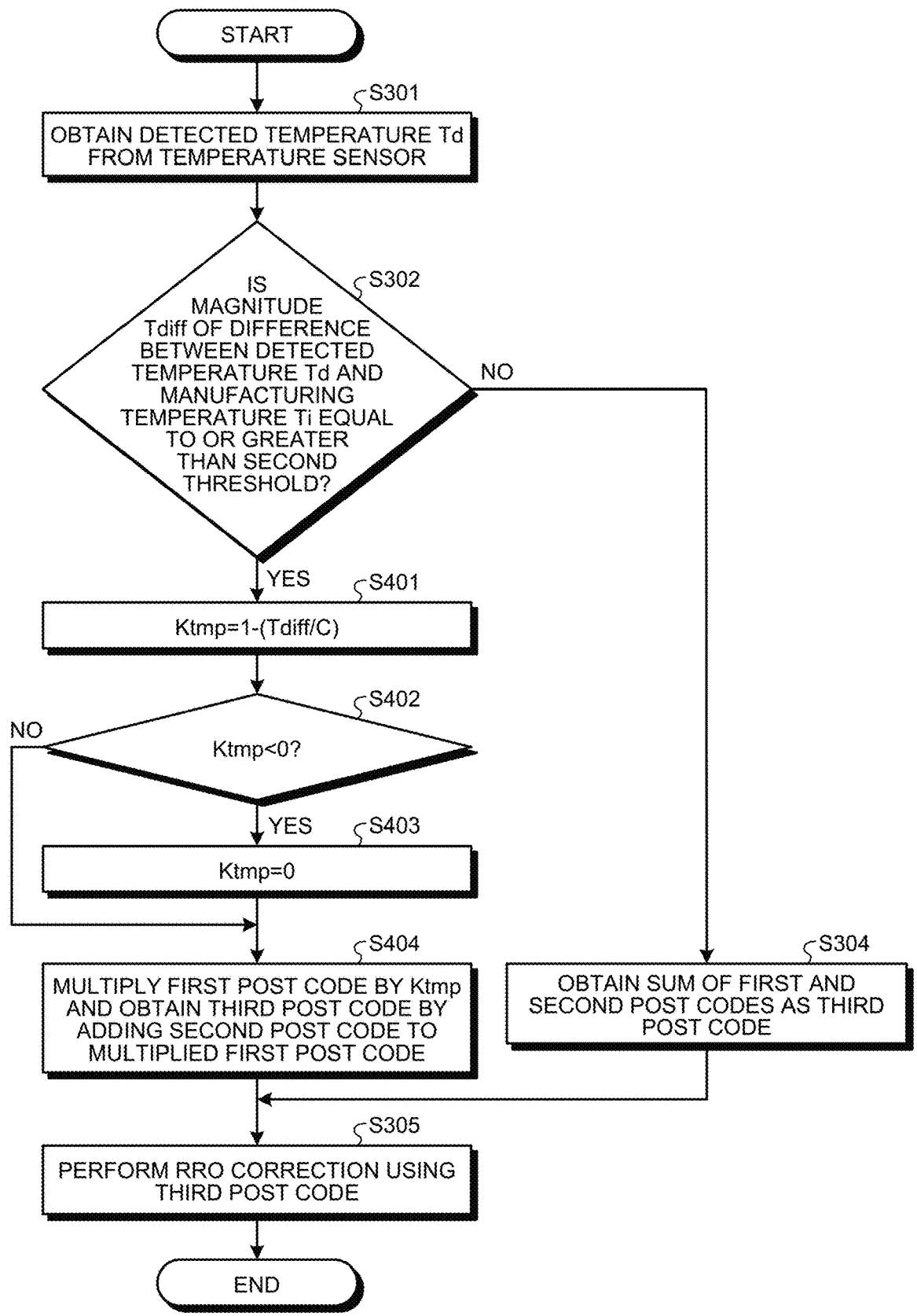
FIG. 8 is a flowchart illustrating an example of operations of a magnetic disk apparatus according to a second embodiment performed in the process of S202 indicated in FIG. 5.

FIG. 8 is a flowchart illustrating an example of operations of a magnetic disk apparatus 1 according to the second embodiment performed in the process of S202 depicted in FIG. 5.

As indicated in FIG. 8, the operations in the second embodiment are different from those in the first embodiment in that the processes of S401 to S404 are performed, instead of the process of S303.

Specifically, when Tdiff is equal to or greater than the second threshold (S302: Yes), the controller 30 first calculates, on the basis of the following Formula (1), a coefficient Ktmp to be temporarily used (S401). In the following Formula (1), C is a real-valued constant that is greater than the second threshold.

$$K\text{tmp}=1-(T\text{diff}/C) \tag{1}$$

Then, the controller 30 determines whether Ktmp is less than 0 (S402). When Ktmp is less than 0 (S402: Yes), the controller 30 sets 0 as Ktmp (S403). When Ktmp is not less than 0 (S402: No), the controller 30 skips the process of S403.

Subsequently, the controller 30 multiplies the first post code by Ktmp, and obtains the third post code by adding the second post code to the multiplied first post code (S404).

When Tdiff is not equal to or greater than the second threshold (S302: No), the controller 30 obtains the sum of the first and second post codes as the third post code (S304).

After S404 or S304, the controller 30 performs an RRO correction using the third post code (S305).

According to the algorithm indicated in S401 to S404 in FIG. 8, the coefficient Ktmp decreases from 1 to 0, as Diff increases from 0. The first post code is multiplied by the coefficient Ktmp, and the second post code is added to the multiplied first post code, so as to obtain the third post code. As Tdiff increases, the third post code obtained in such a manner will be occupied by a decreased amount of components pertaining to the first post code. When Tdiff is equal to or greater than C, the third post code is equal to the second post code.

As described above, the controller 30 may be configured to calculate a coefficient Ktmp that decreases from 1 to 0 as Diff increases from 0, multiply the first post code by the coefficient Ktmp, and obtain the third post code by adding the second post code to the multiplied first post code.

According to the above configuration, the controller 30 can suppress the components of the first post code, which could be a cause of deterioration of the positioning accuracy, as the amount of difference (i.e., Tdiff) between the temperature at generation of the post codes and the temperature during operation increases, so that the positioning accuracy can be suppressed from deteriorating. Thus, the magnetic disk apparatus 1 that allows for an accurate correction of a positioning error of the magnetic head can be provided.

In the example indicated by S401 to S404 in FIG. 8, the controller 30 obtains the third post code on the basis of the algorithm in which the third post code decreases linearly as Tdiff increases from 0. The amount of decrease in the third post code does not necessarily need to have a linear relationship with the amount of increase in Tdiff.

As in the first embodiment, the processing performed when Tdiff is equal to the second threshold is not limited to the example illustrated in FIG. 8.

Third Embodiment

The third embodiment is described with reference to still another example of the algorithm for obtaining the third post code. Matters other than the operation of obtaining the third post code are similar to those in the first embodiment, and the third embodiment is described only for the operation of obtaining the third post code.

Figure 9:
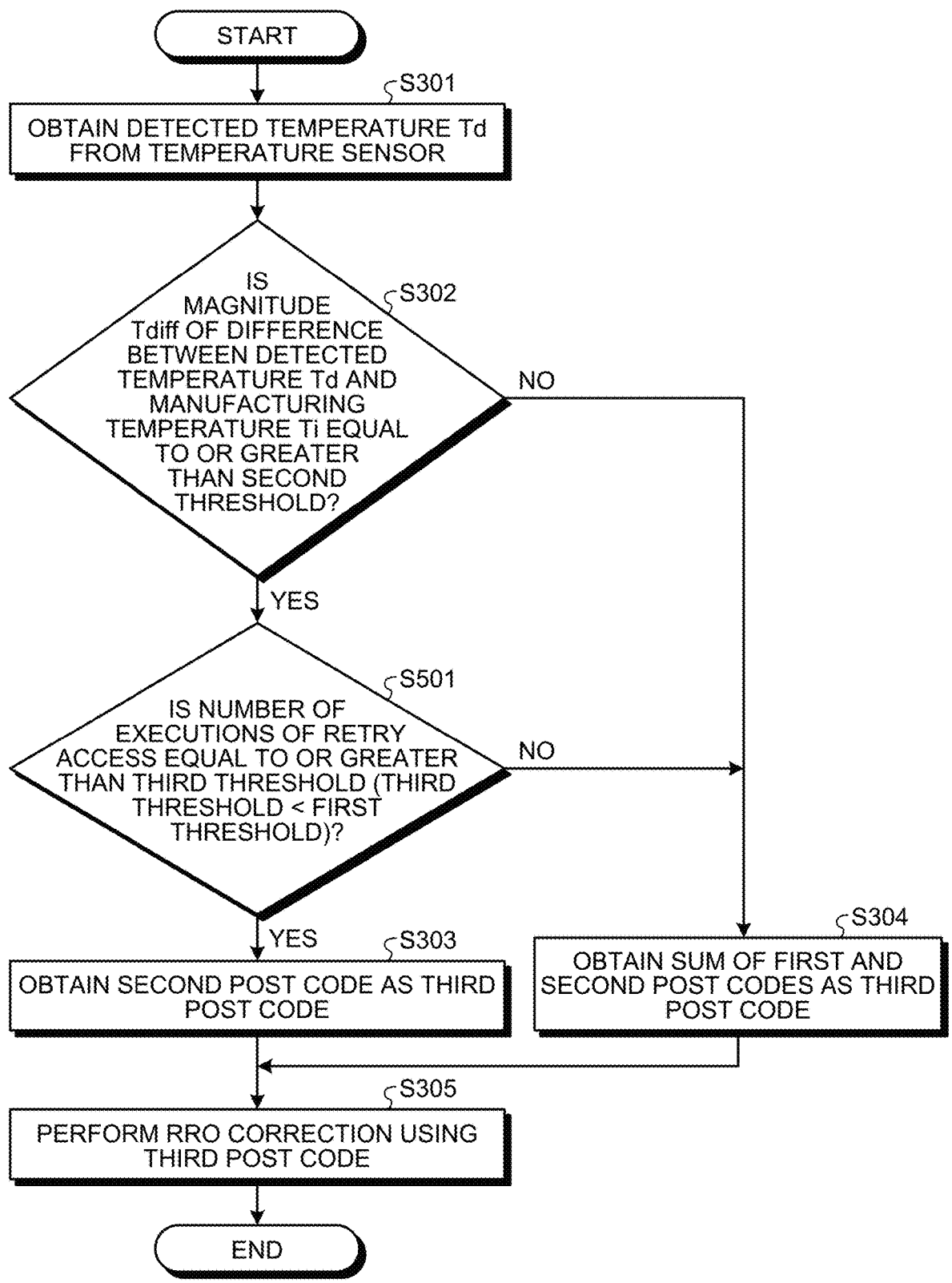
FIG. 9 is a flowchart illustrating an example of operations of a magnetic disk apparatus according to a third embodiment performed in the process of S202 indicated in FIG. 5.

FIG. 9 is a flowchart illustrating an example of operations of a magnetic disk apparatus 1 according to the third embodiment performed in the process of S202 indicated in FIG. 5.

In the third embodiment, the controller 30 obtains the third post code on the basis of the first and second post codes, the temperature, and the number of executions of retry access. More specifically, even when Tdiff is equal to or greater than the second threshold, as long as the number of executions of retry access is small, the controller 30 obtains the third post code by using the same method as a situation in which Tdiff is not equal to or greater than the second threshold. For example, the controller 30 may suppress the components of the first post code, when a third threshold lower than the first threshold is set for the number of executions of retry access, Tdiff is equal to or greater than the second threshold, and the number of executions of retry access is equal to or greater than the third threshold.

In the third embodiment, as indicated in FIG. 9, the processes of S301 and S302 are performed as in the first embodiment. When Tdiff is equal to or greater than the second threshold (S302: Yes), the controller 30 determines whether the number of executions of retry access is equal to or greater than the third threshold (S501). The third threshold is an integer that is lower than the first threshold and is no lower than one. In this example, the first threshold is an integer that is no lower than two.

When the number of executions of retry access is equal to or greater than the third threshold (S501: Yes), the controller 30 obtains the second post code as the third post code (S303). When Tdiff is not equal to or greater than the second threshold (S302: No), or when the number of executions of retry access is not equal to or greater than the third threshold (S501: No), the controller 30 obtains the sum of the first and second post codes as the third post code (S304).

After S303 or S304, the controller 30 performs an RRO correction using the third post code (S305), and the operations end.

In the example illustrated in FIG. 9, the situation in which Tdiff is not equal to or greater than the second threshold or the number of times retry access has been performed is not equal to or greater than the third threshold is an example of a first case. The situation in which Tdiff is equal to or greater than the second threshold and the number of times retry access has been performed is equal to or greater than the third threshold is an example of a second case, in which Tdiff is greater than that in the first case and the number of executions of retry access is larger than that in the first case.

As in the first embodiment, the processing performed when Tdiff is equal to the second threshold is not limited to the example illustrated in FIG. 9.

In the first case, as described above, the controller 30 obtains the sum of the first and second post codes as the third post code. The controller 30 obtains the second post code as the third post code in the second case in which Tdiff is greater than that in the first case and the number of executions of retry access is larger than that in the first case.

If, for example, an amount of positional deviation pertaining to the temperature-dependent components of an RRO is complicatedly changed according to temperature, accurate positioning may be incapable of being performed using the method in the first or second embodiment for obtaining the third post code. In the third embodiment, even when Tdiff is equal to or greater than the second threshold, as long as the number of executions of retry access does not meet a standard, the controller 30 obtains the third post code by using the same method as a situation in which Tdiff is less than the second threshold. Then, when the number of executions of retry access increases, i.e., when it is difficult to implement access by using the third post code obtained according to the sum of the first and second post codes, the controller 30 obtains a third post code by using another method. Thus, when Tdiff is equal to or greater than the second threshold, retry access may be performed using third post codes obtained using two types of different methods. Hence, the probability of successful access increases when an amount of positional deviation pertaining to the temperature-dependent components of an RRO are complicatedly changed according to temperature.

In the third embodiment, the controller 30, in the second case, may also obtain the third post code by using the method indicated by S401 to S404 in FIG. 8 described above by referring to the second embodiment. In particular, the controller 30 may be configured, in the second case, to calculate a coefficient Ktmp that decreases from 1 to 0 as Diff increases from 0, multiply the first post code by the coefficient Ktmp, and obtain the third post code by adding the second post code to the multiplied first post code.

As a general rule, writing requires a higher positioning accuracy than reading. Thus, the techniques described above by referring to the first, second, and third embodiments, when applied to an operation of writing, will exhibit a large advantage owing to the enhancement of positioning accuracy. The techniques described above by referring to the first, second, and third embodiments may be applied to the writing of data to the magnetic disk 11, the reading of data from the magnetic disk 11, or both thereof.

The first, second, and third embodiments have been described on the assumption that the first post code, among the post codes generated on the basis of an RRO, is the components of a temperature-dependent order, and the second post code, among the post codes generated on the basis of an RRO, is the components of a temperature-independent order. The post codes generated on the basis of the RRO do not necessarily need to be divided, on an order-by-order basis, into temperature-dependent components and temperature-independent components. Components pertaining to one order may be divided into temperature-dependent components and temperature-independent components. Thus, the controller 30 may record, in servo sectors SV as the first post code, temperature-dependent components among the post codes generated on the basis of the RRO, and record, in the servo sectors SV as the second post code, temperature-independent components among the post codes generated on the basis of the RRO.

As long as temperature-dependent components and temperature-independent components can be specified through the simple computation based on the first and second post codes, the definitions of the first and second post codes are not limited to the examples described above. For example, the controller 30 may record, as the first post code, temperature-dependent components among the post codes generated on the basis of the RRO, and record, as the second post code, a post code generated on the basis of the RRO. In such a case, by subtracting the first post code from the second post code, the controller 30 can obtain the temperature-independent components included in the post codes generated on the basis of the RRO. The controller 30 may be configured to use, as a second post code in the operation of obtaining a third post code (e.g., operation indicated in FIG.

6, 8, or 9), a post code obtained by subtracting a first post code recorded in a servo sector SV from a second post code recorded in the servo sector SV.

As described above by referring to the first, second, and third embodiments, the controller 30 is configured to perform, in the positioning of the magnetic head 22, a correction by using the third post code that is based on the first and second post codes and a detected temperature detected by the temperature sensor 17. Hence, the magnetic disk apparatus 1 that allows for an accurate correction of a positioning error of the magnetic head 22 can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   a magnetic disk in which is formed a servo sector in which servo data including a first post code and a second post code is recorded;
   a magnetic head;
   a temperature sensor; and
   a controller that performs, in positioning of the magnetic head, a correction by using a third post code that is based on the first post code, the second post code, and a first temperature detected by the temperature sensor, wherein
   the controller stores a second temperature that is a temperature of the magnetic disk apparatus observed when the first post code and the second post code were generated, and obtains the third post code based on the first post code, the second post code, and a magnitude of a difference between the first temperature and the second temperature.

2. The magnetic disk apparatus according to claim 1, wherein
   the first post code is a component dependent on a temperature of the magnetic disk apparatus, and
   the second post code is a component independent of the temperature of the magnetic disk apparatus, and
   the controller
   obtains, in a first case, a sum of the first post code and the second post code as the third post code, and
   obtains the second post code as the third post code in a second case in which the magnitude of the difference is larger than in the first case.

3. The magnetic disk apparatus according to claim 1, wherein
   the first post code is a component dependent on a temperature of the magnetic disk apparatus, and
   the second post code is a component independent of the temperature of the magnetic disk apparatus, and
   the controller calculates a coefficient that decreases from 1 to 0 as the magnitude of the difference increases from 0, multiplies the first post code by the coefficient, and obtains the third post code by adding the second post code to the multiplied first post code.

4. A magnetic disk apparatus comprising:
   a magnetic disk in which is formed a servo sector in which servo data including a first post code and a second post code is recorded;
   a magnetic head;
   a temperature sensor; and
   a controller that performs, in positioning of the magnetic head, a correction by using a third post code that is based on the first post code, the second post code, and a first temperature detected by the temperature sensor, wherein
   the controller obtains the third post code based on the first post code, the second post code, the first temperature detected by the temperature sensor, and a number of re-executions of writing to or reading from the magnetic disk.

5. A magnetic disk apparatus comprising:
   a magnetic disk in which is formed a servo sector in which servo data including a first post code and a second post code is recorded;
   a magnetic head;
   a temperature sensor; and
   a controller that performs, in positioning of the magnetic head, a correction by using a third post code that is based on the first post code, the second post code, and a first temperature detected by the temperature sensor, wherein
   the controller stores a second temperature that is a temperature of the magnetic disk apparatus observed when the first post code and the second post code were generated, and obtains the third post code based on the first post code, the second post code, a magnitude of a difference between the first temperature and the second temperature, and a number of re-executions of writing to or reading from the magnetic disk.

6. The magnetic disk apparatus according to claim 5, wherein
   the first post code is a component dependent on a temperature of the magnetic disk apparatus,
   the second post code is a component independent of the temperature of the magnetic disk apparatus, and
   the controller
   obtains, in a first case, a sum of the first post code and the second post code as the third post code, and
   obtains the second post code as the third post code in a second case in which the magnitude of the difference is larger than in the first case and the number of re-executions is larger than in the first case.

7. The magnetic disk apparatus according to claim 5, wherein
   the first post code is a component dependent on a temperature of the magnetic disk apparatus,
   the second post code is a component independent of the temperature of the magnetic disk apparatus, and
   the controller
   obtains, in a first case, a sum of the first post code and the second post code as the third post code, and
   in a second case in which the magnitude of the difference is larger than in the first case and the number of re-executions is larger than in the first case, calculates a coefficient that decreases from 1 to 0 as the magnitude of the difference increases from 0, multiplies the first post code by the coefficient, and obtains the third post code by adding the second post code to the multiplied first post code.

8. The magnetic disk apparatus according to claim 2, wherein
the first post code is a component of an order dependent on the temperature of the magnetic disk apparatus, and
the second post code is a component of an order independent of the temperature of the magnetic disk apparatus.

9. The magnetic disk apparatus according to claim 3, wherein
the first post code is a component of an order dependent on the temperature of the magnetic disk apparatus, and
the second post code is a component of an order independent of the temperature of the magnetic disk apparatus.

10. The magnetic disk apparatus according to claim 6, wherein
the first post code is a component of an order dependent on the temperature of the magnetic disk apparatus, and
the second post code is a component of an order independent of the temperature of the magnetic disk apparatus.

11. A method for positioning within a magnetic disk apparatus, the method comprising:
positioning a magnetic head on a magnetic disk in which is formed a servo sector in which servo data including a first post code and a second post code is recorded, wherein
the positioning includes performing a correction by using a third post code that is based on the first post code, the second post code, and a first temperature detected by a temperature sensor, wherein
the method further comprising:
storing a second temperature that is a temperature of the magnetic disk apparatus observed when the first post code and the second post code were generated; and
obtaining the third post code based on the first post code, the second post code, and a magnitude of a difference between the first temperature and the second temperature.

12. The method according to claim 11, wherein
the first post code is a component dependent on a temperature of the magnetic disk apparatus,
the second post code is a component independent of the temperature of the magnetic disk apparatus, and
the obtaining includes
obtaining, in a first case, a sum of the first post code and the second post code as the third post code, and
obtaining the second post code as the third post code in a second case in which the magnitude of the difference is larger than in the first case.

13. The method according to claim 11, wherein
the first post code is a component dependent on a temperature of the magnetic disk apparatus,
the second post code is a component independent of the temperature of the magnetic disk apparatus, and
the method comprises:
calculating a coefficient that decreases from 1 to 0 as the magnitude of the difference increases from 0;
multiplying the first post code by the coefficient; and
obtaining the third post code by adding the second post code to the multiplied first post code.

14. The method according to claim 12, wherein
the first post code is a component of an order dependent on the temperature of the magnetic disk apparatus, and
the second post code is a component of an order independent of the temperature of the magnetic disk apparatus.

* * * * *